United States Patent
Kanda et al.

[11] Patent Number: 5,929,905
[45] Date of Patent: Jul. 27, 1999

[54] IMAGING APPARATUS

[75] Inventors: Yuko Kanda, Kanagawa; Tsuneo Sekiya, Tokyo; Hitoshi Nakada, Kanagawa, all of Japan

[73] Assignee: Sony Corporation, Tokyo, Japan

[21] Appl. No.: 08/810,246

[22] Filed: Mar. 3, 1997

[30] Foreign Application Priority Data

Aug. 3, 1996 [JP] Japan ................................. 8-052160

[51] Int. Cl.⁶ .................................................. H04N 5/228
[52] U.S. Cl. .......................... 348/222; 348/312; 348/234
[58] Field of Search ..................... 348/207, 222, 348/234, 262, 294, 295, 297, 311, 312, 536, 539, 453, 454, 441, 263, 65, 71, 72; 250/208.1; H04N 5/228

[56] References Cited

U.S. PATENT DOCUMENTS 5,258,834 11/1993 Tsuji et al. ............................... 348/71
5,402,173 3/1995 Noguchi et al. ......................... 348/312

*Primary Examiner*—Tuan V. Ho
*Attorney, Agent, or Firm*—Frommer Lawrence & Haug, LLP.; William S. Frommer; Dennis M. Smid

[57] ABSTRACT

An imaging signal obtained from CCD is supplied to the pre-processing circuit to form the pre-processing signal consisting of a luminance signal and a color signal and the pre-processing signal is supplied in turn to the post-processing circuit to form the post-processing signal to be outputted to the external circuit or to be recorded. The circuits from CCD to pre-processing circuit are driven by the first clock CKH or the second clock which is slower than the first clock, while the post-processing circuit is driven by the first clock. A clock exchange circuit is provided between the pre-processing circuit and the post-processing circuit, and when the circuits up to the pre-processing circuit are driven by the second clock, the clock exchange circuit is operated to supply the pre-processing signal exchanged to the first clock from the second clock is supplied to the post-processing circuit. Thereby, the post-processing circuit can used in common.

8 Claims, 8 Drawing Sheets

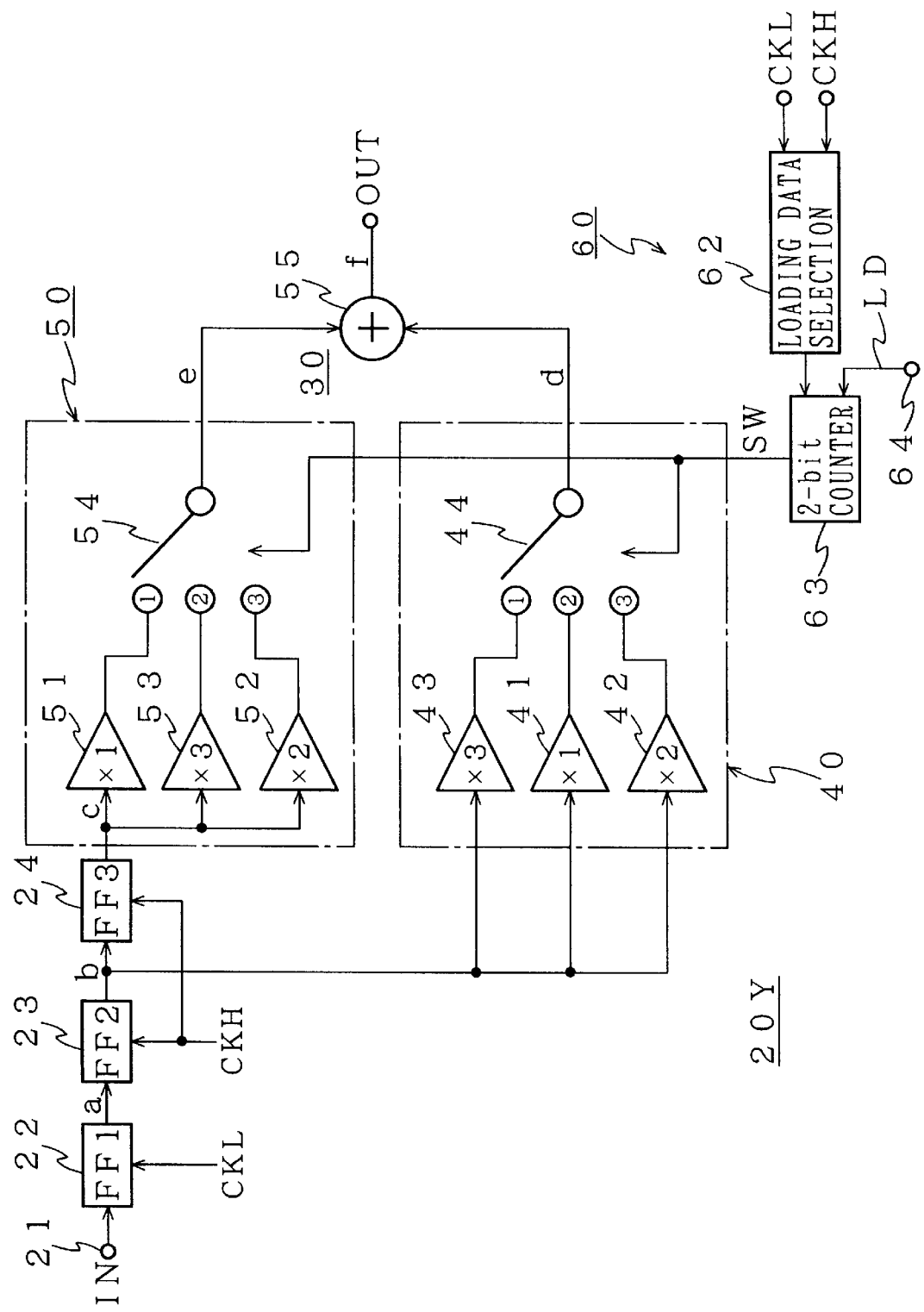

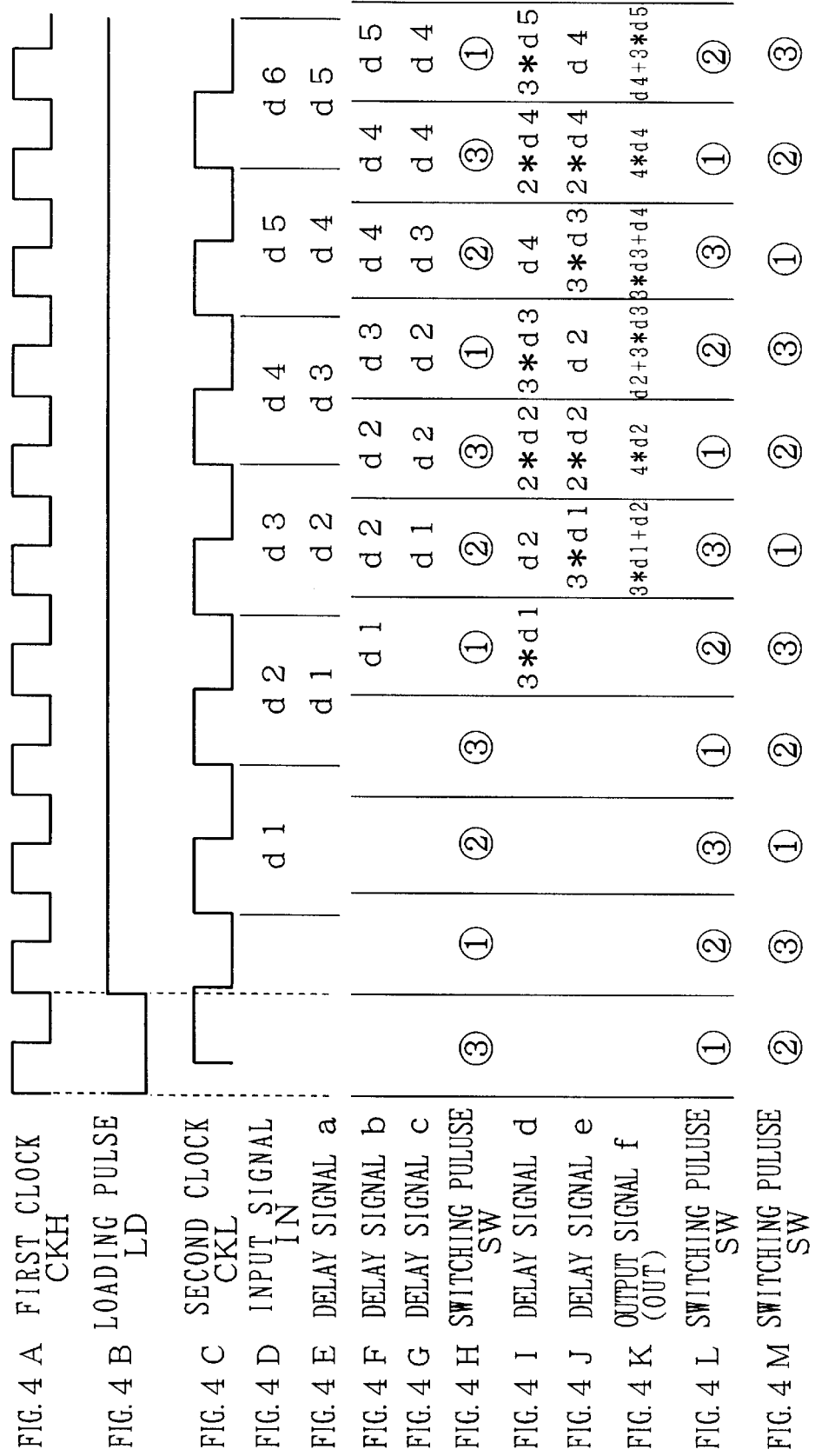

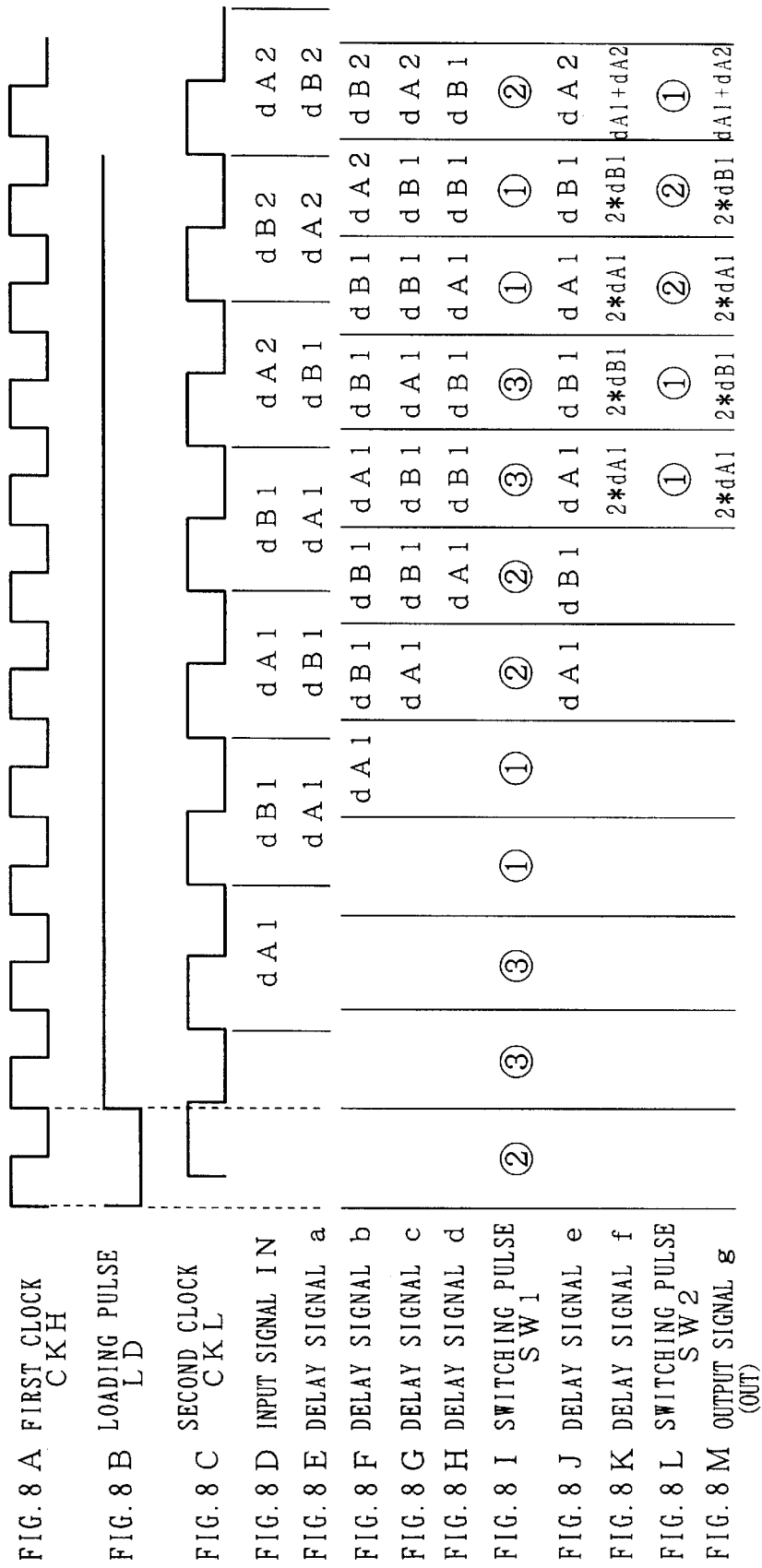

IMAGING APPARATUS

BACKGROUND OF THE INVENTION

1. Field of the Invention

The present invention relates to an imaging apparatus. In more detail, when the signal processing system until the final video signal is formed from an imaging signal is driven by different clocks, a post-processing circuit is used in common without relation to the clock used by inserting a clock exchange circuit between a pre-processing circuit of a second clock and the post-processing circuit which is operated with a first clock which is higher than the second clock and transferring the pre-processing signal having been exchanged to the first clock from the second clock in the clock exchange circuit to the post-processing circuit.

2. Description of the Related Art

In an imaging apparatus comprising the recording and reproducing functions such as a camera-integrated video (video-integrated camera), an imaging device in different number of pixels, for example, a CCD is sometimes used as the imaging device. In this case, the clock (first clock) when a CCD having a large number of pixels is used is naturally higher in the frequency than the clock (second clock) when a CCD having a small number of pixels is used. At present, a CCD of the type using the second clock which is equal to ⅔ frequency of the first clock is known.

When the clocks used are different in the frequency as explained above, the signal processing system which can execute the processing with the clock depending on the CCD used is generally formed to obtain the final output signals (such as video signal and color signals of R, G, B) by processing the imaging signal obtained from the imaging device. Therefore, a plurality of imaging apparatuses in different types are used depending on the type of CCD used.

In the related art, as explained above, since a plurality of imaging apparatuses of different types are used depending on CCD used, the signal processing systems must be prepared depending on CCD and the interfaces for the imaging apparatuses must be prepared depending on the type of CCD.

Even in such a case, when the common part is structured in common as much as possible, possible cost-down may be realized. Moreover, when the signal processing system which can use the final output stage in common can be structured, it is no longer required to prepare a plurality of interfaces because the common interface with an external circuit can be used.

OBJECT AND SUMMARY OF THE INVENTION

The present invention therefore proposes an imaging apparatus which has solved the problems of related art explained above and can use, even when CCD is driven with the clock different from that used in the final output stage, the signal processing system of the final output stage in common by adding a clock exchange function.

In view of solving the problems explained previously, the imaging apparatus of the present invention comprising:

pre-processing means for forming a pre-processing signal consisting of a luminance signal and a color signal from an imaging signal obtained from an imaging device;

post-processing means for forming a post-processing signal to be outputted to the external circuits or recorded from the pre-processing signal;

drive means for driving from the imaging device to pre-processing means with a first clock or with the second clock which is lower than the first clock and for driving the post-processing means with the first clock;

clock exchange circuit provided between the pre-processing means and the post-processing means; and control means for activating the control to operate, when the circuits up to the pre-processing means is driven by the second clock, the clock exchange circuit to supply the pre-processing signal exchanged to the first clock from the second clock to the post-processing means.

In the clock exchange circuit, the clock exchange processes are executed separately for the luminance signal and color signal obtained from the imaging signal. In the luminance signal system, since the luminance signal is a sequential signal, at least two delay devices are enough for delaying the signal. These two delay devices operate with a higher frequency clock, namely the first clock CKH. Since the signal from the delay device operating with the second clock which is lower than the first clock is supplied to these two delay devices, the signals exchanged respectively to the first clock can be obtained.

If this new signal is used in direct, aliasing may occur. Therefore, the smoothing effect can be obtained in the signal after the clock exchange operation by further filtering the new signal. As a result, the signal exchanged to the first clock and having completed the smoothing process can be obtained.

The similar process can also be executed to the color signal. In this case, when the color signal is obtained as the point sequence signal unlike the luminance signal, clock exchange and smoothing process are executed using at least four delay devices operating with the first clock.

With the process explained above, the post-processing circuit which functions as the signal processing system provided in the final output stage can be used in common and thereby the same interface can also be used as the interface to the external circuits.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 3 is a system diagram showing an example of a clock exchange circuit provided in a luminance signal system;

FIGS. 4A–4M are explanatory diagrams of operations of FIG. 3;

FIGS. 8A–8M are explanatory diagrams of operations of FIG. 7; and

DESCRIPTION OF THE PREFERRED EMBODIMENT

A preferred embodiment of the imaging apparatus of the present invention will be explained in detail with reference to the accompanying drawings. In the example explained below, a single plate type imaging apparatus (camera-integrated video) is indicated, in which a solid state imaging device such as CCD is used as the imaging device and a complementary color filter of the layout shown in FIG. 2, for example, is used to generate a color signal (color difference signal) by utilizing a line correlation.

Figure 2:
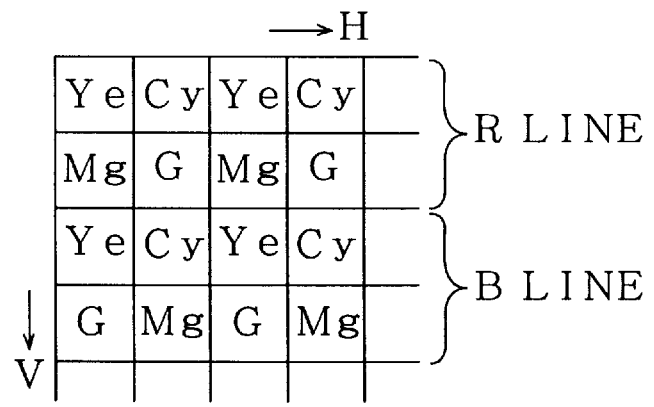
FIG. 2 is a structural diagram showing an example of a color filter used in the present invention.

In the structure of FIG. 2, the signals of two lines are simultaneously read from the color filter to form the R/B signals or color difference signal of these signals. In FIG. 2, one is called the R line, while the other is called the B line.

Figure 1:
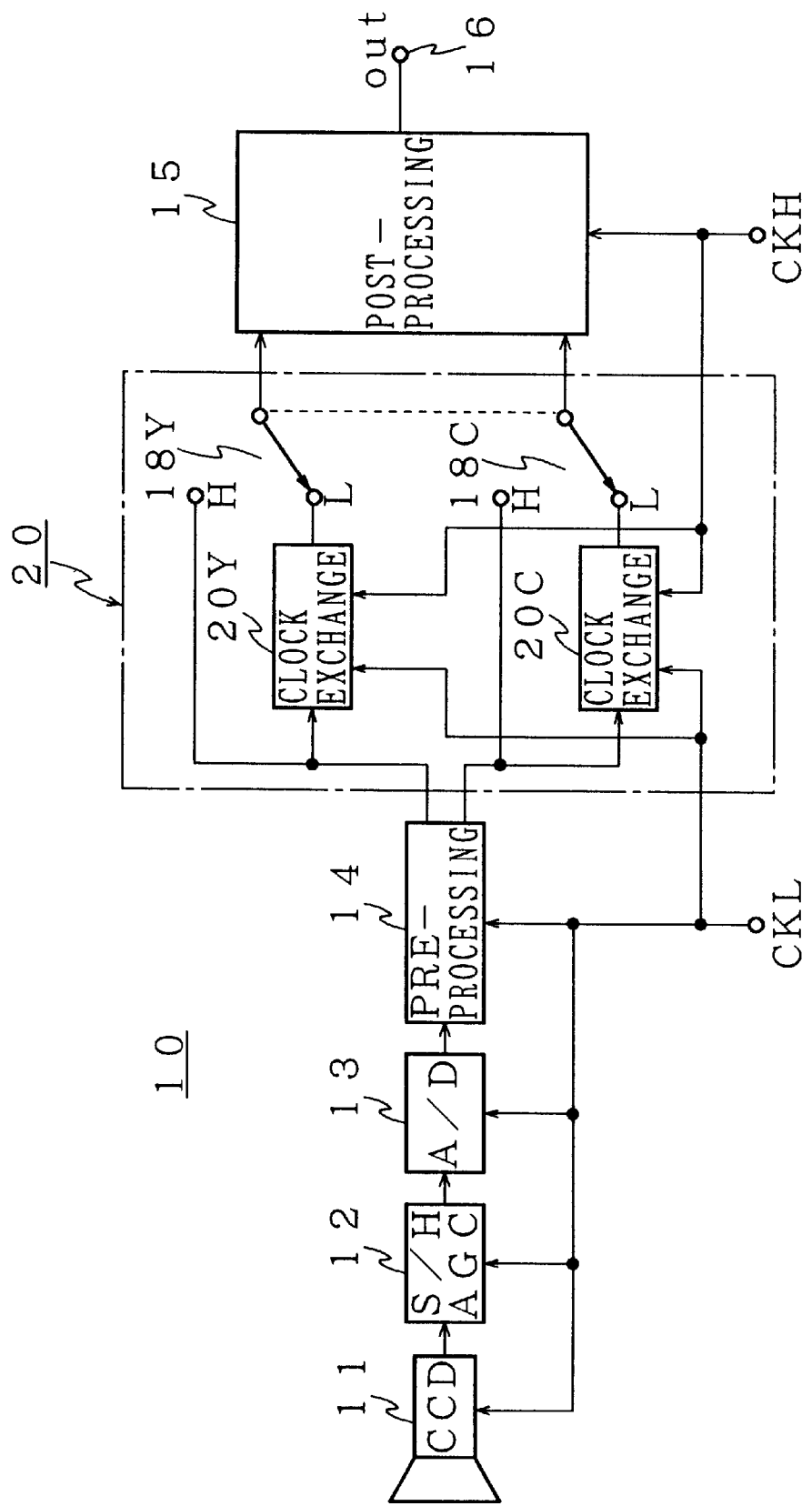
FIG. 1 is a system diagram showing a preferred embodiment of the essential portion of the imaging apparatus of the present invention.

A preferred embodiment of the imaging apparatus 10 of the present invention using this color filter is shown in FIG. 1.

In FIG. 1, an imaging signal outputted from the CCD 11 used as the imaging device is subjected to a sampling hold process and a gain control for matching with a dynamic range of a digital circuit in the subsequent stage in a sampling and AGC circuit 12. Thereafter, such signal is converted to the digital signal of the predetermined number of bits. The digital imaging signal is supplied to a pre-processing circuit 14 to obtain, in this example, a luminance signal Y and a color difference signal between the signals R and B. While the luminance signal Y is obtained as a sequence signal, the color difference signal is obtained as a point sequence signal. These signals are generally called as a pre-processing signal.

The pre-processing signal is supplied to a post-processing circuit 15 to obtain a post-processing signal as the predetermined signal format. As the post-processing signal obtained at an output terminal 16, a composite video signal to which various synchronous signals are added and three primaries signals of R, G, B are considered.

The post-processing circuit 15 is driven by a first clock CKH. On the other hand, when the CCD 11 having a large number of pixels is used, it is driven by the first clock but the CCD 11 having a small number of pixels is driven by a second clock CKL which is lower in the frequency than the first clock. Since the a small number of pixels is about ⅔ of the large number of pixels, the second clock CKL is also about ⅔ of the first clock CKH.

When the first clock CKH is used for the CCD 11, there is no problem because the entire part can be processed by the same clock. When the CCD 11 is driven by the second clock CKL, the circuits up to the pre-processing circuit 14 are driven by the second clock CKL as shown in FIG. 1.

In the present invention, in order to exchange the clock (reformation of clock) when the clocks used are different, a clock exchange circuit 20 is provided between the pre-processing circuit 14 and the post-processing circuit 15.

Since the clock exchange circuit 20 includes the part driven by the second clock CKL and the part driven by the first clock CKH, both clocks are supplied to the clock exchange circuit 20 and different exchange circuits 20Y and 20C are respectively used for the luminance signal processing system and color signal processing system. It is because the luminance signal is a sequence signal and the color signal is a point sequence signal.

The imaging apparatus 10 is provided with the clock exchange circuit 20 and the post-processing circuit 15 as the common circuit system. Considering the use of CCD having a large number of pixels, changeover switches 18Y and 18C are provided between the clock exchange circuit 20 and the post-processing circuit 15 and automatic switching operation of the switches 18Y and 18C is performed on the basis of the instruction signal from a control section (not illustrated) structured by a microcomputer.

FIG. 3 shows a practical example of the clock exchange circuit 20Y used in the luminance signal system. The clock exchange circuit 20Y has three stages of flip-flop circuits 22, 23, 24 which are connected in series to function as the delay device, because, in order to exchange the second clock CKL to the first clock CKH, at least three delay devices are necessary.

Namely, it is because, first, the input signal (pre-processing signal) must be synchronized with the second clock signal CKL, second, the signal synchronized with the second clock CKL must be synchronized with the first clock CKH and, third, the signal before one clock is necessary for filtering the signal synchronized with the first clock CKH.

To the first flip-flop circuit 22 connected to an input terminal 21, the second clock CKL which is the clock of the pre-processing system is supplied and the first clock CKH used in the post-processing system is supplied to the two flip-flop circuits 23, 24 in the successive stage. Since the frequencies of the first and the second clocks CKH, CKL are in the relation of 3:2, these signals are indicated as shown in FIGS. 4A to 4C.

Since the luminance signal Y (indicated as di in FIG. 4D) from the pre-processing circuit 14 is supplied to the input terminal 21, this signal is delayed by one clock as indicated by FIG. 4E by the first flip-flop 22 with reference to the second clock CKL. The delay signal a is delayed by one clock in the second flip-flop 23 by the first clock CKH and the delay signal b is also delayed by one clock in the third flip-flop 24 to obtain the delay signal c (FIG. 4G).

These signals b, c delayed by the first clock CKH are supplied to a filtering circuit 30 for the purpose of filtering operation (smoothing operation). The filtering circuit 30 is formed of a pair of gain adjusting circuits 40, 50 and an adder 55, and a delay signal b is supplied to one of gain adjusting circuit 40.

The gain adjusting circuit 40 comprises three gain amplifiers 41, 42, 43 providing the magnification resulting in the gain of 100%, 200% and 300% for the delay signal b and these amplifiers are sequentially switched by a first switch 44 in the sequence indicated in the figure.

The other gain adjusting circuit 50 also comprises three gain amplifiers 51, 52, 53 providing the magnification resulting in the gain of 100%, 200% and 300% for the delay signal c and a second switch 54 used to switch these outputs. The second switch 54 is also operated in the sequence instructed in the figure. The two output delay signals d, e switched are added in an adder 55.

The first and the second switches 44, 54 are synchronously operated using a switching pulse SW from a switching pulse generating circuit 60. Since this generating circuit 60 determines the switching sequence depending on the clock CKL and CKH, the initial value (2-bit data) of the loading data to be loaded to a 2-bit counter 63 is selected in the loading data selecting section 62 to which the clocks CKL and CKH are supplied and the selected value is loaded to the counter 63. The timing for the loading is the loading pulse LD to be supplied to a terminal 64 (FIG. 4B).

In this example, when the rising edge of the second clock CKL when the loading pulse LD is given is in the high level period of the first clock CKH, the switches 44, 54 are switched in the rotation as shown in FIG. 4H. For instance, when the rising edge is in the low level period of the first clock CKH, rotation shown in FIG. 4L is executed. When there is no rising edge of the second clock CKL in the loading pulse, rotation shown in FIG. 4M is executed.

As the clocks CKL, CKH, those generated by the same clock generator (not illustrated) are generally used and the phases of these clocks are assumed to be matched. A phase difference of these clocks is different depending on the drive timing of the clock generator and therefore the switching pulse generating circuit 60 as shown in FIG. 3 is necessary.

When the switches 44, 54 are switched in such rotation, output delay signals d and e are obtained as the outputs of FIGS. 4I and 4J. As a result, when these clocks are added, the final output signal f shown in FIG. 4K can be obtained.

As will be apparent from this output signal f, the rotation for switching the gain adjusted signals is determined so that the gain as a result of addition becomes equal. Moreover, since an average value with the data immediately before the gain adjusted signals d, e can be obtained by addition thereof, the added signal f having completed the filtering operation, namely the added signal f having completed the smoothing operation can also be obtained.

The signal having exchanged the clock can also be generated using the signal shown in FIGS. 4F and 4G but this signal includes the high frequency element to a considerable degree and may generate the aliasing. However, when the filtering operation is executed, the output signal f given the low-pass characteristic can be obtained and smooth signal can also be obtained.

With the processes explained above, the output signal f (luminance signal Y) having completed the exchange to the first clock CKH and completed the filtering operation can be obtained.

Figure 5:
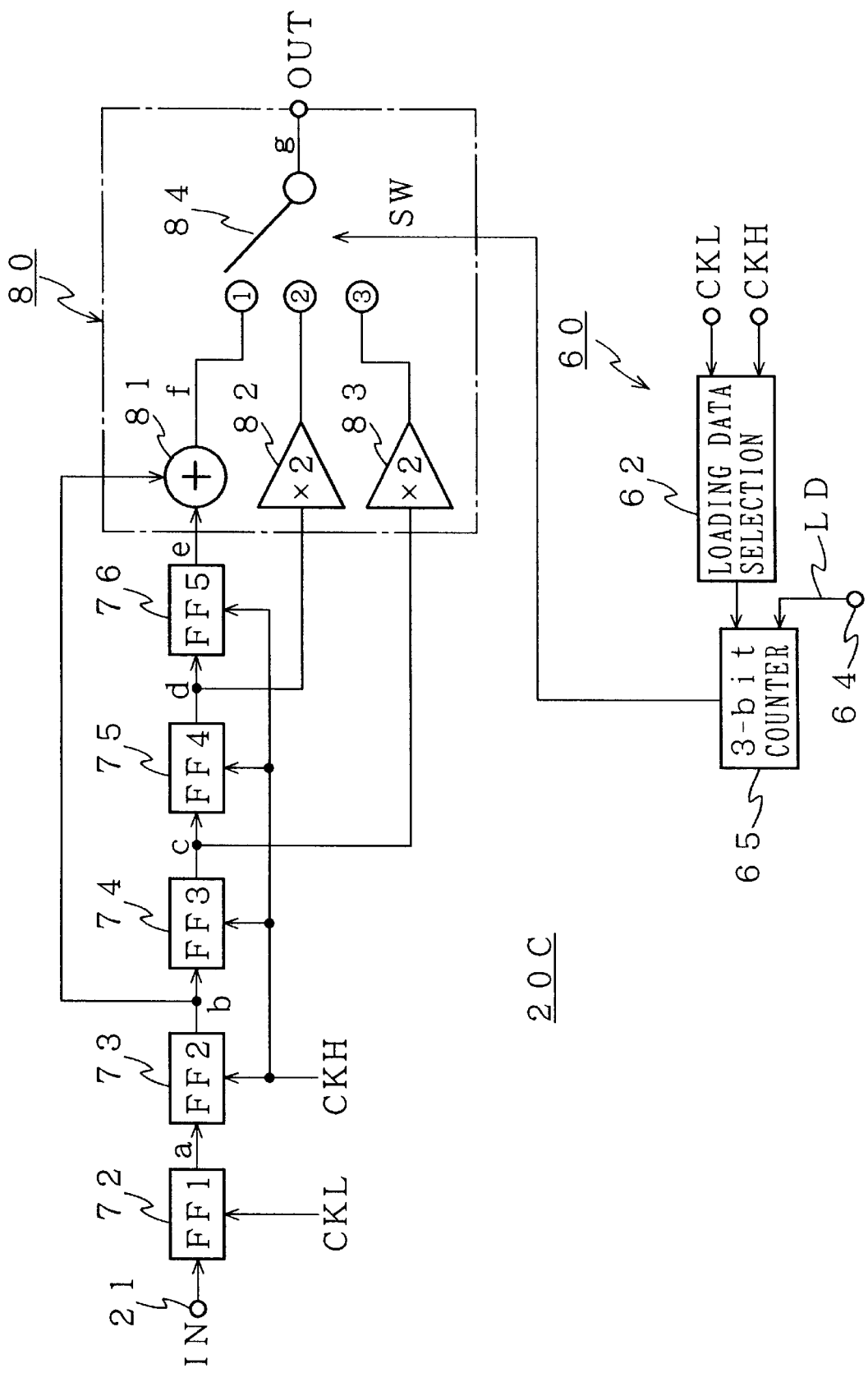
FIG. 5 is a system diagram showing an example of a clock exchange circuit provided in a color signal system.

FIG. 5 shows a practical example of the clock exchange circuit 20C for the color signal C. Since the color signal is a point sequence signal, the color signal is multiplexed in the clock rate of ½ to that of the first clock CKH. In such a relationship, the flip-flop circuits which function as the delay device are cascade-connected in five stages in total (72 to 76).

The first flip-flop 72 synchronizes the input signal to the second clock CKL, while the second flip-flop 73 synchronizes the signal synchronized with the second clock to the first clock CKH. Moreover, the flip-flop circuits 74, 75, 76 which are connected in three stages and driven by the first clock CKH are used as the delay device for the filtering operation.

Figure 6:
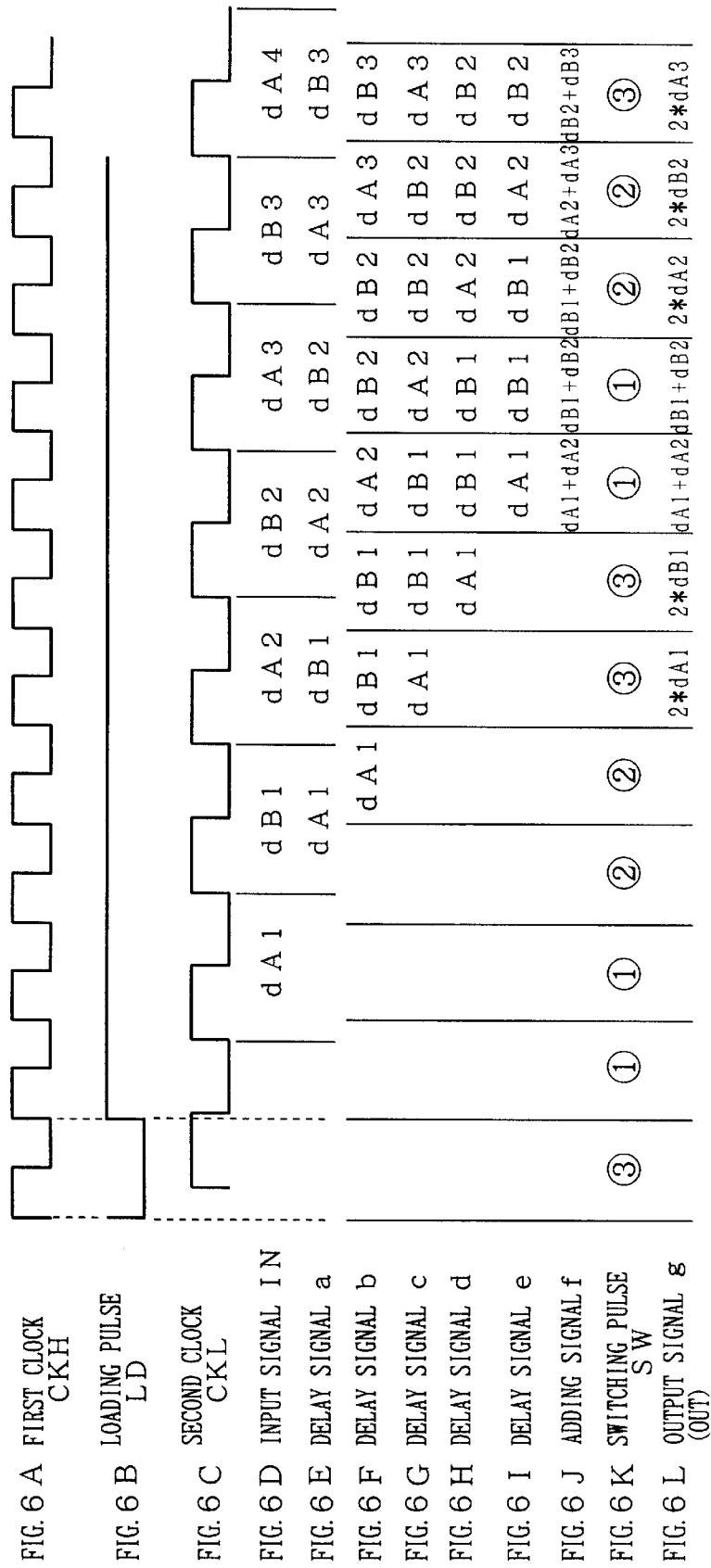
FIGS. 6A–6L are explanatory diagrams of operations of FIG. 5.

Since the frequencies of the first and the second clocks CKH, CKL are in the ratio of 3:2, these signals can be indicated as shown in FIGS. 6A to 6C.

The color signal C (pre-processing signal) is supplied from the pre-processing circuit 14 to the input terminal 21. In FIG. 6D, one color signal (for example, color difference signal of R) is indicated as dAi, while the other color signal (color difference signal of B) is indicated by dBi.

Explanation about the part overlapping with the contents of FIG. 3 is eliminated, but the color signal C of FIG. 6D is delayed by one clock as shown in FIG. 6E with reference to the second clock CKL in the first flip-flop circuit 72. The delay signal a is delayed as much as one clock with the first clock CKH system in the second flip-flop 73 and its delay signal b (FIG. 6F) is further delayed sequentially as much as one clock in the third to fifth flip-flop circuits 74 to 76 to obtain the delay signals c, d, e (FIGS. 6G to 6I).

These signals b to e delayed by the first clock CKH are supplied to a filtering circuit 80 for the purpose of filtering operation (smoothing operation). The filtering circuit 80 comprises an adder 81 for adding the signals b and e and a pair of gain amplifiers 82, 83 for magnifying the gain up to two times.

The added output f is indicated as the signal FIG. 6J and the signal c obtained through gain-up is then supplied to the switch 84. The switching pulse generating circuit 60 employs the structure similar to that of FIG. 3 but the counter 65 used here is a 3-bit counter which loads the data of 3-bit. However, in this example, since the same signal is used twice, rotation of the switching pulse SW is as shown in FIG. 6K.

When the signals c, d, f are switched in this sequence, the signal adding the forward and backward elements of the same color signal and the single signal having increased the gain can be obtained as the output signal g. As is apparent from this result, the gain amplifiers 82, 83 having the magnifying power up to two times are used to keep the gain of the output signal g.

In view of obtaining the equal gain of the selected signals, the switch 84 is changed over in the rotation explained above and moreover as a result that the average value with just immediate data can be obtained by adding the gain-adjusted signals b, e, the added signal f having completed the filtering operation, namely the added signal f having completed the smoothing operation can be obtained.

With the operations explained above, the color signal C having been exchanged to the first clock CKH and having completed the smoothing operation can be obtained. Therefore, the post-processing signal processed by the first clock CKH can be obtained by giving this color signal C and the luminance signal Y explained above to the post-processing circuit 15 (FIG. 1).

In the switching pulse generating circuit 60 explained above, it is also possible that the loading data applied to the counters 63 and 65 may be loaded in direct to these counters by generating these data in the control section (not illustrated) loading a microcomputer in order to control the apparatus as a whole.

Figure 9:
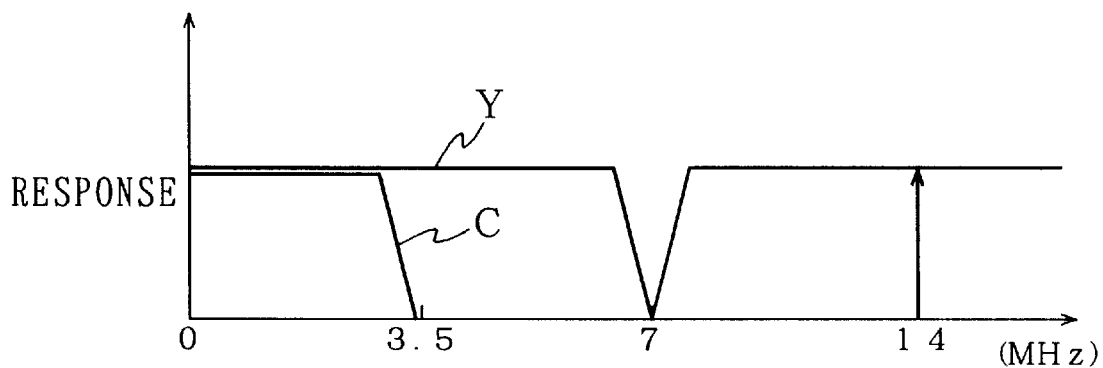
FIG. 9 is a diagram showing the frequency band of the signal.
Figure 7:
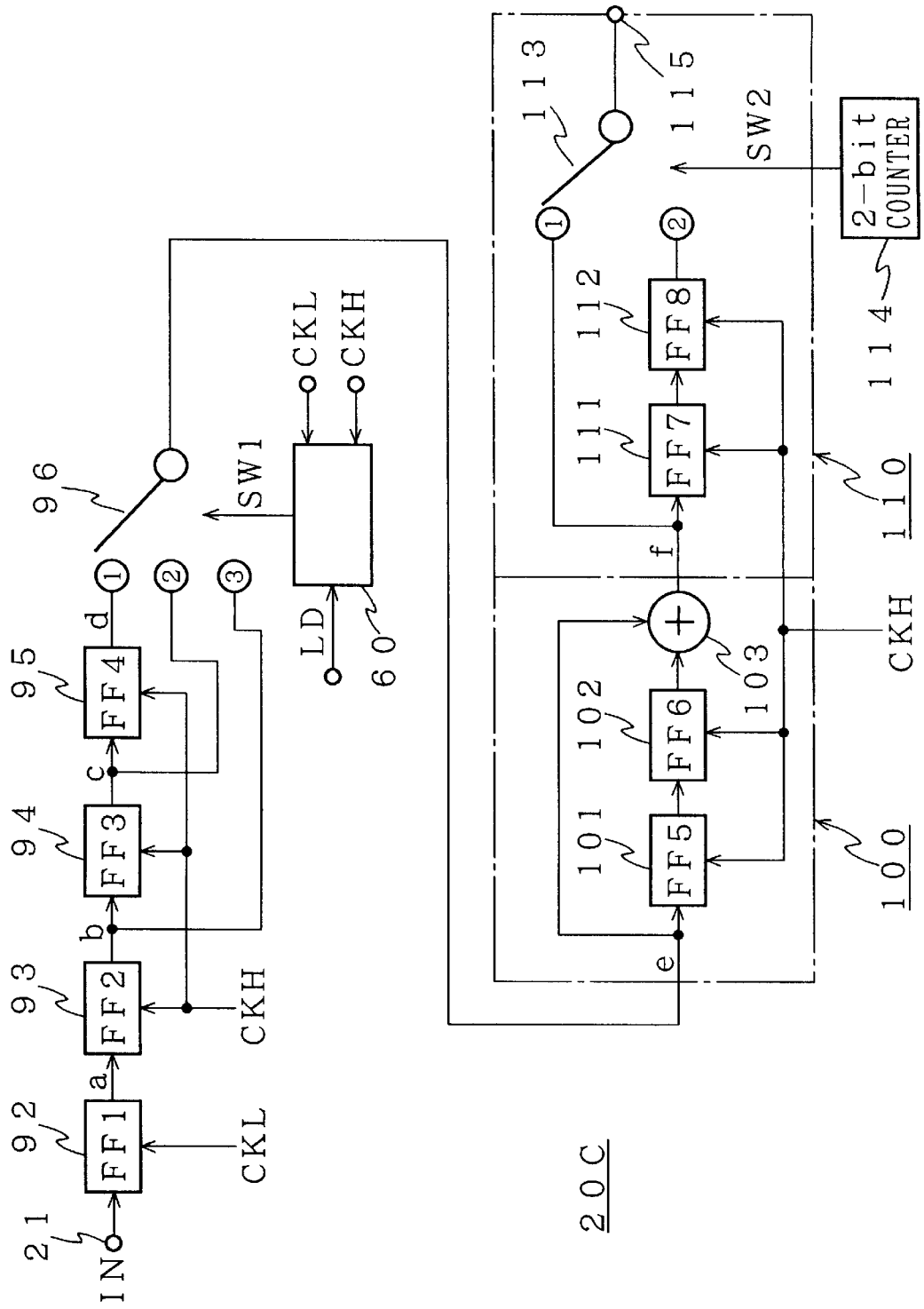
FIG. 7 is a system diagram showing the other example of a clock exchange circuit provided in a color signal system.

FIG. 7 and subsequent figures respectively show the practical examples of the clock exchange circuit 20C in such a case that the clock rate of the color signal is set to ¼ of the clock of luminance signal. Therefore, in this case, the sampling clock is set to 14 MHz as shown in FIG. 9, while the bandwidth of 7.0 MHz or less which does not generate any return distortion is set as the bandwidth of the luminance signal Y and the bandwidth which is ½ or less of such bandwidth is used as the bandwidth of the color signal C.

In the clock exchange circuit 20C shown in FIG. 7, the cascade-connected flip-flops of four stages 92, 93, 94, 95 are provided to function as the delay device. An input signal is time series signals (dRi, dBi) which are outputted twice continuously as a pair of the same color difference signal as shown in FIG. 8D and this input signal IN supplied to the terminal 21 is supplied to the flip-flop 92 of the first stage and thereby the signal a (FIGS. 8C and 8E) synchronized with the second clock CKL can be outputted.

The delay signal a is delayed as much as one clock by the first clock CKH system in the second flip-flop 93 and such delay signal b (FIG. 8F) is further delayed sequentially as much as one clock respectively by the third and fourth flip-flop circuits 94, 95 to generate the delay signals c, d (FIGS. 8G and 8H).

These signals b, c, d delayed by the first clock CKH are supplied to the switch 96 and it is then converted into the time series signals forming a pair with six clocks by the smoothing control with the switching pulse SW1 shown in FIG. 8I (FIG. 8J).

As explained previously, the flip-flop circuits 93, 94, 95 of three stages and the switch 96 are used to convert the delay signal b synchronized with the first clock CKH system into the time series signals forming a pair with six clocks. A pair is formed of six clocks, considering the filtering operation (smoothing operation) in the subsequent state.

The signal e forming a pair with six clocks is supplied to a low-pass filter 100 for the filtering operation. The low-pass filter 100 is a digital filter formed of a pair of flip-flop circuits 101, 102 and an adder 103 adding the input and the final output. Since this filter adds the signal e before two clocks, the signal f obtained from the adder 103 is indicated as shown in FIG. 8K.

The added signal f is further delayed as much as two clocks by a pair of flip-flop circuits 111,112 forming the smoothing circuit 110 and this signal and added signal f are switched in every continuous two clocks by the switch 113. Thereby, the color signal which is synchronized with the first clock CKH and has the time series similar to that of the input signal having compensated the smoothing can be obtained finally at the terminal 115 as shown in FIG. 8M.

Here, as the switch 96 in the preceding stage, the switching pulse generating circuit 60 shown in FIG. 5 may be used and as the switch 113 of the subsequent stage, a counter 114 of 2-bit is used and the switching pulse SW2 which is switched in unit of two clocks as indicated in FIG. 8L can also be used.

As explained previously, the present invention provides a clock exchange circuit. Therefore, when the clock processed in the circuit up to the pre-processing circuit is different from that used in the post-processing circuit system of the clock exchange circuit, this clock exchange circuit is operated to exchange the pre-processing signal with the clock of the post-processing signal to obtain the post-processing signal having completed the smoothing operation.

According to the present invention, even when the circuits from the imaging device to the pre-processing circuit are operated with the clock different from the clock of the post-processing circuit, the clock can be matched with that of the post-processing circuit only by adding such clock exchange circuit. In this case, since the signal is transmitted to the post-processing circuit system through execution of the smoothing operation, the monitor image obtained becomes more natural, not resulting in any sense of incongruity due to the clock conversion.

This process enables common use of the post-processing circuit and external interface. Therefore, remarkable cost-down can be realized in comparison with the related art. As a result, the present invention is extremely effective to application into an electronic apparatus such as a camera-integrated video apparatus.

Although preferred embodiment of the present invention has been described and illustrated, it will be apparent to those skilled in the art that various modifications may be made without departing from the principles of the invention.

What is claimed is:

1. An imaging apparatus comprising:
   pre-processing means for forming a pre-processing signal consisting of a luminance signal and a color signal from an imaging signal obtained from an imaging device;
   post-processing means for forming a post-processing signal to be outputted to external circuits or to be recorded from said pre-processing signal;
   drive means for driving circuits from said imaging device to said pre-processing means with the first clock or the second clock which is lower than said first clock and driving said post-processing means with said first clock;
   clock exchange circuit provided between said pre-processing means and post-processing means; and
   control means for operating, when the circuit from said imaging device to said pre-processing means are operated by said second clock, said clock exchange circuit to control the pre-processing signal exchanged from said second clock to first clock so that said pre-processing signal is supplied to said post-processing means.

2. An imaging apparatus according to claim 1, wherein the ratio of said second clock and first clock is set to 2:3.

3. An imaging apparatus according to claim 1, wherein when said pre-processing signal is a luminance signal, said clock exchange circuit includes a delay device operating with said second clock and at least two delay devices operating with said first clock, said second and third delay devices output second and third delay signals exchanged to said first clock, these delay signals are respectively supplied to the filtering circuit to be exchanged to the first clock and the luminance signal having completed the filtering operation can be obtained.

4. An imaging apparatus according to claim 3, wherein said filtering circuit is formed of a gain amplifier which can give different gains and the filtered luminance signal after the smoothing operation can be obtained by mixing a plurality of delay signals given the gain.

5. An imaging apparatus according to claim 3, wherein said delay device is a flip-flop circuit.

6. An imaging apparatus according to claim 1, wherein when said pre-processing signal is a color signal and are two kinds of color signals having the clock rate of ½ for the luminance signal, said clock exchange circuit includes a first delay device operating with said second clock and at least four delay devices from second to fifth device operating with said first clock, the second to fifth delay devices output the second to fifth delay signals exchanged to said first clock, and these delay signals are supplied respectively to the filtering circuit and are exchanged to the first clock to provide the filtered color signal.

7. An imaging apparatus according to claim 6, wherein said filtering circuit is formed of a gain amplifier which gives a plurality of different gains to provide the filtered luminance signal after the smoothing operation by sequentially selecting a plurality of delay signals having obtained the gain.

8. An imaging apparatus according to claim 1, wherein when said pre-processing signal is a color signal and two kinds of color signals having the clock rate of ¼ for the luminance signal, said pre-processing circuit outputs twice continuously the same color signal, said clock exchange circuit includes a first delay device operating with said second clock and at least three delay devices of second to fourth devices operating with said first clock, said second to fourth delay devices output the second to fourth delay signals exchanged to said first clock, these delays signals are sequentially supplied to the filtering circuit for the purpose of filtering operation, and the filtered color signal, exchanged to the first clock, having the time series in unit of the color signal processing of four clocks can be obtained by repeatedly using twice the two kinds of color signals having completed the filtering operation.

* * * * *

UNITED STATES PATENT AND TRADEMARK OFFICE
CERTIFICATE OF CORRECTION

PATENT NO. : 5,929,905
DATED : Jul. 27, 1999
INVENTOR(S) : Kanda et al.

It is certified that error appears in the above-identified patent and that said Letters Patent is hereby corrected as shown below:

On the title page,
Under [30]      Foreign Application Priority Data

Change "Aug. 3, 1996" to --Mar. 8, 1996--

Signed and Sealed this

Twenty-first Day of December, 1999

Attest:

Q. TODD DICKINSON

*Attesting Officer*          *Acting Commissioner of Patents and Trademarks*